3,003,882
IMITATION ICE CREAM CONTAINING HIGHLY UNSATURATED VEGETABLE OIL
Robert M. Peat, Sun Valley, Calif., assignor, by mesne assignments, to Frozen Dessert Company, Hollywood, Calif., a corporation of California
No Drawing. Filed Aug. 25, 1959, Ser. No. 835,826
4 Claims. (Cl. 99—136)

This invention relates to ice cream composition of the type commonly known as imitation ice creams or imitation ice milks wherein the butter-fat content of the standard ice cream or ice milk products is replaced with some other edible fat or oil such as hydrogenated edible oils.

This invention also relates to new combinations or compositions of edible ingredients which result in finished products that have similarity to the type of products commonly known as imitation ice creams or imitation ice milks, but have identities of their own, separate and distinct from true or standard dairy products and from so-called "imitations" thereof because dairy products are wholly or partly excluded from these new products.

The principal object of this invention is to produce so-called imitation ice creams or ice milks, or products similar in physical appearance, but not in some component ingredient sources, to ice creams or ice milks, and wherein advantage is to taken of the dietetic values of a particular group of refined, edible, non-toxic, non-cathartic, non-hydroxy, non-hydrogenated, highly unsaturated vegetable oils that possess certain characteristics of dietary vlaue useful for control of atherosclerosis or arteriosclerosis. These characteristics include the absence of cholesterol, large percentages of unsaturated fatty acids, large percentages of the essential fatty acids, linoleic and arachidonic acids which similarly are unsaturated and have been demonstrated to exert a regulatory effect on cholesterol level in the human body. These oils are non-hydrogenated corn oil, cottonseed oil, sesame oil, soy oil, safflower oil and sunflower oil, and all of them have hardening or solidification temperatures below —20° F.

An additional object of the invention is to make available to the child or adult consumer who has demonstrated allergies to cow's milk or dairy products, a new, nutritional frozen dessert type product that has the cool, refreshing qualities and physical appearance of ice cream made from cow's milk, yet contains no fat, carbohydrate or protein obtained from the milk of the cow.

However, it was expected that refined oils of vegetable origin that remained liquid at extremely low temperatures, because of their high degree of unsaturation and lack of hardness as a result of the omission of the chemical process of hydrogenation, would thus be unsatisfactory to incorporate into the composition of imitation ice creams, ice milks or similar frozen desserts because the finished products would not have suitable consistency and physical characteristics similar to the aforementioned products. It was further expected that this particular group of liquid oils with pour points near or much lower than the temperature of the product as it is commonly drawn from the processor's freezing equipment, would separate and bleed out or "oil off" from the other constituent ingredients of the product. It was also to be expected that oils of this particular group, not being firm or solidified in the normal ice cream or imitation ice cream handling range between 0° F. and —20° F., would bleed out or seep from the finished frozen product during normal commercial handling.

I have nevertheless made the surprising and unexpected discovery that the oils of this particular group of highly unsaturated, edible, dietetic oils, with high percentages of the essential fatty acid, linoleic acid, are excellent replacements for butter fat in frozen desserts without the expected oil seepage or oil separation, despite their very low hardening temperatures.

More descriptively, the oils in this group are refined, non-hydrogenated, edible grade oils, obtained from the plants with the botanical names, "*Carthamus tinctorius*" (safflower); "*Helianthus annuus*" (sunflower); "*Sesamum indicum*" (sesame); "*Glycine max*" (soybean); "*Zea mays*" (corn); and "*Gossypium*" (cotton).

More specifically this invention therefore resides in the use of the aforementioned oils in imitation ice creams and ice milks and similar frozen desserts because of their high content of unsaturated fatty acids (about 75% or higher, such as 90%); their high linoleic acid contents (about 35% or higher, especially above about 50%); their absence of cholesterol; and their characteristic of exerting a regulatory effect on cholesterol level in the human body.

The six oils with approximate pertinent characteristics are:

| Oil | Pour Point,[1] ° F. | Iodine Number | Sat'd Fatty Acids, percent | Unsaturated Acids, percent | Linoleic Acid, percent |
| --- | --- | --- | --- | --- | --- |
| Corn | 15 | 123 | 11.7 | 88.3 | 42.3 |
| Cottonseed | 29 | 110 | 25.6 | 74.4 | 49.7 |
| Safflower | 7 | 145 | 6.1 | 93.9 | 67.3 |
| Sesame | 25 | 110 | 13.0 | 87 | 37.7 |
| Soybean | 15 | 132 | 11.4 | 88.6 | 52.6 |
| Sunflower | 10 | 133 | 7.4 | 92.6 | 58.6 |

[1] Pour test as determined by A.S.T.M. D97 Method. The solidification of all these oils is below —20° F.

It will be appreciated that where fatty acids are herein mentioned they actually are present in the oils in the form of their tri-glycerides, but the terms "fatty acid" and "fatty acids" are used as more difinitive for the present purpose and also because they are generally so reported in the analyses.

It has been discovered that in spite of their physical characteristics of extremely low pour points and solidification points, these oils do not bleed out nor escape from the other solidified ice cream or ice milk constituents at the freezing and handling temperatures to which standard and imitation ice creams and ice milks are exposed. This result was most surprising.

When the aforementioned selected group of oils are used with normal component ingredients of standard or imitation ice creams or ice milks such as sugars, "milk-solids-not-fat" (non-fat milk solids), water and the usual bodying agents or stabilizers and emulsifiers in the upper portions of the commonly acceptable percentage ranges for stabilizers and emulsifiers, as more fully set out below, the finished desserts are comparable to the existing ice cream type desserts.

Another discovery of equal surprise was recognized when the aforementioned selected group of oils were mixed with sugars, vegetable proteins, animal proteins other than the proteins of cow's milk, or combinations of vegetable proteins and animal proteins other than the proteins of cow's milk such as combinations of soybean protein and egg protein, water, and bodying agents or stabilizers and emulsifiers, as more fully set forth below; the finished desserts, processed in the normal methods of processing ice creams and imitation ice creams, frozen and with air or "overrun" thus incorporated, provided frozen desserts with the refreshing qualities and physical appearance of ice cream made from cow's milk, yet contained no fat, protein, or carbohydrate from cow's milk.

In producing an imitation ice cream or ice milk wherein the aforementioned group of selected oils are used as the fatty constituent, it is usually with non-fat milk solids, sugars, water, a stabilizer and emulsifier, as well as a selected flavoring agent or extract, salt, color, fruit additions, nuts, egg constituents and so on, as may be preferred for the particular product. However, I have further found that the non-fat milk solids portion of standard ice creams and ice milks, and imitation ice creams and ice milks, may be replaced with a combination of other mono, di, and poly saccharides and vegetable proteins, or with animal proteins other than the proteins of cow's milk, which are suitable as to flavor, color and compatability as illustrated by the proteins of soybeans, cottonseed proteins, the proteins of eggs, fish proteins, gelatin, and combinations of any of these.

The following table is presented as typical of those products according to this invention where non-fat milk solids are used as the protein content, flavoring additives and the like which are used as a matter of choice being here omitted, such as the mentioned color, salt, fruit, nuts, eggs and kindred materials:

Table I

|  | Typical, percent | Average Range, percent | Overall Range, percent |
|---|---|---|---|
| Selected oil | 11 | 4 to 12 | 2 to 22 |
| Milk Solids (non-fat) | 11 | 9 to 12 | 6 to 15 |
| Sugar Solids | 15 | 11 to 17 | 10 to 20 |
| Stabilizer | 0.3 | 0.2 to 0.4 | 0.1 to 1.0 |
| Emulsifier | .25 | 0.2 to 0.3 | 0.1 to 0.5 |
| Water (q.s.) about | 62.5 | 70.0 to 60 | 75 to 45 |

The following table is typical of that group of products wherein the milk solids of the above Table I are replaced by vegetable protein, or other animal protein than milk solids, or any mixture of such proteins:

Table II

|  | Typical, percent | Average Range, percent | Overall Range, percent |
|---|---|---|---|
| Selected oil | 11 | 4 to 12 | 2 to 22 |
| Protein Solids (non-milk) | 4 | 3 to 5 | 2 to 6 |
| Sugar Solids | 22 | 16 to 22 | 15 to 25 |
| Stabilizer | 0.3 | 0.2 to 0.4 | 0.1 to 1.0 |
| Emulsifier | 0.25 | 0.2 to 0.3 | 0.1 to 0.5 |
| Water (q.s.) about | 62.5 | 70.0 to 60 | 75 to 45 |

Percentages given herein are by weight.

From the above tables it becomes apparent that the proteins of the non-fat milk solids (about ⅓ thereof) of Table I have been replaced by other proteins, and that the saccharides (about ⅔ of the milk solids, such as lactose) have been replaced by other sugars which are commonly used in the food industry.

As to such other proteins replacing milk proteins, these are at present desirably separated soybean proteins and egg proteins, used either individually or in any mixture of the two. However, other proteins of acceptable flavor, color, dispersibility and physical structure entering well into the ice cream texture or compatible therewith may be used, such as separated peanut protein, cottonseed protein, gelatin, fish protein and other finely divided vegetable or animal proteins.

With respect to the stabilizers, these may be natural or synthetic edible products which possess hydrophilic properties, regulate the size of ice crystals in the ice cream mix to small size upon freezing, and help maintain the stability of the resultant oil-in-water emulsion. Examples of such stabilizers are gelatin, Irish moss, locust bean gum, sodium carboxymethyl cellulose, karaya gum, gum arabic, gum tragacanth, agar agar, carrageenin, guar and the like.

Here the stabilizer would commonly be employed to the extent 0.3% to 0.4%. Some commercial stabilizers (using the term "stabilizer" in its broad sense) are furnished with carriers, such as sugar, for easy dispersion in the mix. Where the percentages are indicated, it is understood that these figures refer to the stabilizing constituents only, and without inclusion of any carrier or filler. This applies also to the other bodying agents, emulsifiers, where they contained carriers or the like.

From the standpoint of the emulsifiers, any of those commonly used in the food industries, and more particularly those used in the ice cream and ice milk industry, are acceptable, such as egg yolk, various mono and diglycerides and combinations thereof, lecithins, and other edible natural or synthetic products which result in stable oil-in-water emulsions and possess the property in part of being both oil and water soluble as required for any such stable emulsion.

An important aspect of the present improvement lies in the use of an emulsifier which is also an anti-oxidant. Lecithins perform such a dual function because they posses the qualifications necessary for creating a stable oil-in-water emulsion in the standard or imitation products, and also because of their less known function as anti-oxidants. This value lies especially in connection with "re-freeze," a term commonly applied in the standard or imitation ice cream industry to portions of a batch which are left over from one day's production to be utilized in a future day's production. The highly unsaturated oil, being considerably more subject to oxidative type rancidity than the highly saturated fats (whether naturally saturated or as a result of the hydrogenation process), is particularly benefited through the use of lecithins by their additional function of acting as antioxidants to aid in the prevention of re-freeze rancidity and subsequent loss. For this purpose, more lecithin, such as soybean lecithin, is used than for emulsifying purposes alone. Thus, instead of using 0.25% to 0.3% or 0.5%, as in the tables above, up around 1.0% of soybean lecithin, or even up to 2.0%, is better as long as no objectionable soybean flavor is imparted. Therefore, in addition to the listed emulsifiers above, it is to be understood that the lecithins are considered beneficial for their physical (emulsification) characteristics, chemical (antioxidant) properties, and physiological qualities (generally recognized lipotropic qualities or ability to dissolve fat).

Of course, other edible anti-oxidants may be employed for the prevention of oxidative rancidity without increasing the emulsifier content. Such an anti-oxidant might be hydroquinone, butylated hydroxy toluene, butylated hydroxy anisol or others which are deemed permissible under the provisions of the Pure Food and Drug Act. Lecithins however are preferred.

The above constituents are combined according to any well-known or preferred ice cream mixing process, and the mix is frozen and packaged according to usual or preferred procedure.

There are great dietetic advantages in oils possessing the qualities previously mentioned as characteristics of the aforementioned selected group of oils as a replacement for butter-fat or normally solid vegetable or other fats or hydrogenated vegetable oils having melting or hardening points approaching normal or room temperatures, because these fats are believed by heart authorities to be responsible for raising the blood cholesterol in man to objectionable levels, a condition generally accepted as a predisposing factor in atherosclerosis or arteriosclerosis. By use of the highly unsaturated oils of the class consisting of safflower oil, cottonseed oil, corn oil, sesame oil, sunflower oil and soybeam oil, with their large contents of linoleic acid, cholesterol deposits are believed by many medical authorities to be suppressed or avoided. All these oils in addition to being edible and not artificially hydrogenated, are non-hydroxy, non-toxic and non-cathartic.

The essential fatty acids, of which linoleic acid is the most noteworthy, are not as adequately present in other edible oils or fats as they are in the aforementioned group of selected oils, nor are both contents of linoleic acid individually and total unsaturated fatty acids combined adequately high in other commercially available oils or fats, as they are in the selected group herein described.

Thus, in accordance with this invention, persons who are required to control their instake of cholesterol or to select foods containing specific types of fat, namely highly unsaturated fats with high percentage of the essential fatty acid, linoleic acid, may still enjoy a frozen dessert of the ice cream type and, in addition, conform with requirements as to the type of fat they may ingest. Not only may the ultimate consumer obtain a dietary benefit by control of his cholesterol intake and saturated fatty acid intake and by increase of his essential fatty acid intake through the medium of the present group of cholesterol-free, highly unsaturated vegetable oils, while at the same time enjoying his frozen ice cream type dessert, but also the frozen dessert manufacturer obtains the benefit of manufacturing a frozen dietary type product which is readily frozen to a desired consistency and handled in a conventional manner without separation of the highly unsaturated oil from the frozen product.

Since butter-fat and naturally saturated or hard fats, or artificially hydrogenated fats are in a firm state after being incorporated into a standard or imitation ice cream or ice milk mix, and frozen to conventional ice cream handling temperatures between 0° F. and −20° F., it was expected that the use of the aforementioned oils, selected for their dietary values, would seep or drain out from the other constituents of the frozen product during freezing, handling or storage. It was believed that some unusual measure or measures would have to be taken. It was therefore with much surprise that it was discovered that, with the utilization of stabilizers and emulsifiers at their higher indicated levels, not only did the entire product have desired consistency, but there was no oil separation or breakdown or indication of any heterogeneous condition in the finished frozen food products.

While certain specific embodiments are herein disclosed as representing what is at present believed to be the best manner of practicing the invention hereof, it is to be understood that the invention extends also to variations within the scope of the patent claims.

The invention claimed is:

1. A frozen stabilized dessert composition containing as its essential ingredients approximately:
   (a) 2–22% by weight of a vegetable oil having a pour point lower than the freezing point of water and an unsaturated fatty acid content of more than about 70%,
   (b) 2–15% of a material selected from the class consisting of non-fat milk solids and non-milk protein solids,
   (c) 10–25% of sugar solids other than lactose of non-fat milk solids, and
   (d) 45–75% of water.

2. A frozen dessert composition according to claim 1 wherein said unsaturated vegetable oil is selected from the group consisting of corn oil, cottonseed oil, safflower oil, sesame oil, soybean oil and sunflower oil.

3. A frozen dessert composition according to claim 1 wherein said unsaturated vegetable oil is safflower oil.

4. A frozen dessert composition according to claim 1 wherein said unsaturated vegetable oil is corn oil.

References Cited in the file of this patent

UNITED STATES PATENTS

| | | |
|---|---|---|
| 1,434,070 | Smith | Oct. 31, 1922 |
| 2,065,398 | Roth et al. | Dec. 22, 1936 |
| 2,821,480 | Hilker | Jan. 28, 1958 |
| 2,890,959 | Phillips | June 16, 1959 |

UNITED STATES PATENT OFFICE

CERTIFICATE OF CORRECTION

Patent No. 3,003,882                          October 10, 1961

Robert M. Peat

It is hereby certified that error appears in the above numbered patent requiring correction and that the said Letters Patent should read as corrected below.

In the grant, lines 2 and 12, and in the heading to the printed specification, line 5, for "Frozen Dessert Company", each occurrence, read -- Frozen Desserts Company --; column 1, line 28, strike out "to"; line 32, for "vlaue" read -- value --; column 4, line 18, for "posses" read -- possess --; same column, line 68, for "soybeam" read -- soybean --.

Signed and sealed this 11th day of September 1962.

(SEAL)
Attest:

ERNEST W. SWIDER                          DAVID L. LADD

Attesting Officer                            Commissioner of Patents